2,806,047

LOWER ALKYL ESTERS OF Δ⁷, 6-KETOOCTENOIC ACID AND METHOD OF PREPARING THE SAME

Milon W. Bullock, Pearl River, N. Y., assignor to American Cyanamid Company, New York, N. Y., a corporation of Maine No Drawing. Application October 19, 1953,
Serial No. 387,024

5 Claims. (Cl. 260—410.9)

This invention relates to new organic compounds. More particularly, it relates to unsaturated aliphatic acids, esters and salts thereof and methods of preparing the same.

In my copending application, Serial number 284,205, filed April 24, 1952, I described the preparation of omega [3-(1,2-dithiolanyl)] aliphatic acids, salts and esters thereof. These compounds were described as oxidation inhibitors and growth supporting factors for certain microorganisms including *S. facelis*, *Tetrahymena geleii* and some Corynebacterium species. Also disclosed in the said application was the use of unsaturated aliphatic acids, esters and salts thereof as intermediates in the preparation of new active compounds. The present application is a continuation-in-part of application, Serial Number 284,205 and describes and claims the said intermediates.

The new compounds of the present invention may be illustrated by the following structural formula:

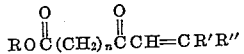

in which R is a lower alkyl radical, R' and R" are hydrogen and lower alkyl radicals and $n$ is a whole number less than 7.

The compounds of the present invention are, in general, liquids at room temperature. They are immiscible with water and soluble or miscible with the usual organic solvents such as acetone, chloroform, ether, etc.

To prepare the compounds of the present invention it is preferred that ester-acid halides of the type RO—CO—(CH$_2$)$_n$COX, where R is lower alkyl, X is halogen, preferably chlorine, and $n$ is a whole number less than 7, be used. These ester-acid halides are reacted with alkenes such as ethylene, propylene, butylene, isobutylene and the like in the presence of a catalyst, preferably anhydrous aluminum chloride.

The reaction to prepare the compounds of the present invention may be illustrated as follows:

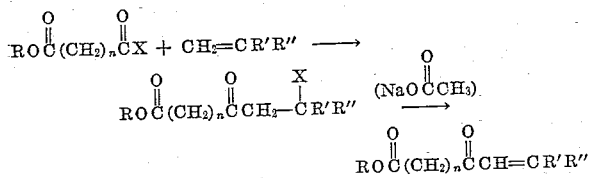

in which R is a lower alkyl radical, R' and R" are hydrogen or a lower alkyl radical and $n$ is a whole number less than 7.

The reaction can be carried out by bubbling the alkene through a solution of anhydrous aluminum chloride in the acid chloride at a temperature of from 10° to 75° C. until no more alkene is absorbed. The reaction can also be carried out by adding the acid chloride to a solution or suspension of the catalyst in an appropriate solvent such as ethylene chloride, methylene chloride, nitrobenzene, ethyl bromide or carbon disulfide through which a stream of the alkene is being passed.

When the reaction is complete the product is obtained by pouring the reaction mixture into crushed ice and an organic solvent such as ethyl acetate and separating the organic solvent layer. The solution of the β-haloketoester is reacted with at least one equivalent of sodium acetate or tertiary amine such as dimethylaniline or diethylaniline which yields the unsaturated keto ester by dehydrohalogenation.

The solution of the β-ketoester is washed with water to remove the salts and the solvent removed by distillation. The product can be further purified by distillation under reduced pressure.

The following examples illustrate in greater particularity the preparation of the compound of the present invention.

Example 1

Ethylene gas was passed into a stirred solution of 35.4 grams (0.273 mole) of anhydrous aluminum chloride in 26.3 g. (0.136 mole) of ethyl adipyl chloride. The solution became slightly warm and some hydrochloric acid was evolved. After six hours the mass solified. The contents of the reaction flask were stirred into a mixture of ice and water and the product extracted with chloroform. The chloroform solution was washed with half saturated sodium bicarbonate solution and dried over sodium sulfate. The solvent was distilled off and the residue purified by distillation under reduced pressure. All the product distilled 116°–118° at 1.5 mm. The yield 8.0 g. (0.043 mole), 32% of the desired ethyl Δ⁷,6-ketooctenate.

Example 2

In a 300 ml. three-necked flask equipped with stirrer, condenser, gas inlet tube and dropping funnel, were placed 69.5 g. (0.52 mole) of anhydrous aluminum chloride and 100 ml. of ethyl bromide. The solution was stirred rapidly and a stream of ethylene bubbled through the solution while 50 g. (0.26 mole) of ethyl adipyl chloride was added dropwise over a period of one hour. The ethylene gas was bubbled through the cold solution for two hours and the mixture passed slowly into a stirred solution of ice and water. The organic layer was separated, washed with sodium bicarbonate solution and dried over sodium sulfate. The solvent was evaporated and the residue purified by distillation under reduced pressure. The product, which is identical with that of Example 1 is distilled 112°–114° at 0.2 mm. The yield was 12 g. (0.065 mole) or 17%.

Example 3

In a 3-liter, three neck flask equipped with stirrer, dropping funnel and gas outlet were placed 700 ml. of nitrobenzene. The reaction flask was cooled in an ice bath and 500 g. (3.78 moles) of powdered anhydrous aluminum chloride was added in portions over a period of five minutes. Now 360 g. (1.87 mole) of ethyl adipyl chloride was added from the dropping funnel over a period of 15 minutes. The dropping funnel was replaced by a gas inlet tube of the sintered glass type and ethylene gas was bubbled through the rapidly stirred solution for four and one-half hours. The temperature of the reaction mixture was maintained at 45°±3° during the first three hours and then allowed to cool. The reaction mixture was stirred into a mixture of ice and chloroform containing a small amount of hydroquinone as a stabilizer. The organic layer was separated, washed with water, dilute sodium hydroxide and again with water. The organic layer was dried over sodium sulfate and the chloroform removed by distillation on the steam cone. The nitrobenzene was distilled off at 10 mm. Copious quantities of hydrogen chloride were evolved during the distillation of this solvent. The product was distilled under reduced pressure through a 24" heated Vigreux column using an oil bath to supply the heat. After a small forerun the product distilled 110°–115° at 2–3 mm. The yield was 165.5 g. (0.905 mole), 48%. The pure ethyl $\Delta^{7,6}$-keto-octenoate has $N_D^{25}$ 1.4481, $N_D^{20}$ 1.4500.

*Example 4*

In a liter three-neck flask equipped with stirrer, dropping funnel and air condenser were placed 300 ml. of nitrobenzene. The flask was cooled in a cold water bath while 244 g. (1.8 moles) of powdered aluminum chloride was stirred in. Now 150 g. (0.84 mole) of ethyl glutaryl chloride was added through the dropping funnel over a period of 15 minutes. The dropping funnel was replaced by a gas inlet tube and ethylene gas was bubbled through the rapidly stirred solution for six hours. The reaction mixture was stirred into crushed ice. Five hundred ml. of chloroform was added and the organic layer separated. The chloroform extract was washed with half-saturated sodium bicarbonate solution and dried over sodium sulfate. The chloroform was distilled off on the steam bath and the residue distilled under reduced pressure. The fraction distilling 98°–101° at 2 mm. was collected as product. The yield was 53.9 g. (0.316 mole), 38%. The product, ethyl $\Delta^{6,5}$-ketoheptenoate, had $N_D^{20}$ 1.4513.

*Example 5*

In a liter three-neck flask equipped with stirrer, air condenser and dropping funnel were placed 350 ml. of nitrobenzene. The reaction flask was cooled in an ice bath and 363 g. (2.72 mole) of powdered anhydrous aluminum chloride was added over a period of five minutes. Now 250 g. (1.30 moles) of ethyl adipyl chloride was added over a period of fifteen minutes. The dropping funnel was replaced with a gas inlet tube of the sintered glass type and propylene was bubbled through the rapidly stirred solution for four hours. The temperature of the reaction mixture was maintained at 45°±3° by cooling during the first two and one-half hours and then allowed to cool slowly after the exothermic reaction was complete. The reaction mixture was stirred into a mixture of crushed ice and chloroform containing one gram of hydroquinone. The organic layer was separated, washed with water and with half-saturated sodium bicarbonate solution. A few ml. of ethanol was added during the bicarbonate wash to break up a troublesome emulsion. The chloroform-nitrobenzene solution was dried over sodium sulfate and the chloroform distilled off on the steam bath. Reduced pressure was used to remove the last traces of low boiling solvent and possibly much hydrogen chloride. After storage at −20° overnight, the nitrobenzene was distilled off at 10 mm. Much hydrogen chloride was evolved during this distillation. The product was distilled under reduced pressure through a 12" vacuum jacketed Vigreux column. The product was distilled twice to yield 131.3 g. (0.664 mole), 51% of pure ethyl $\Delta^{7,6}$-ketononenoate, boiling point 103°–107° at 0.6–1 mm. and having $N_D^{20}$ 1.4578.

*Example 6*

In a liter three-neck flask equipped with a fast and efficient stirrer, condenser, thermometer and dropping funnel were placed 350 ml. of ethylene chloride and 277 g. (2.08 moles) of anhydrous aluminum chloride. The reaction mixture was cooled in an ice bath and 200 g. (1.04 moles) ethyl adipyl chloride was added through the dropping funnel at such a rate that the temperature remained between 40° and 45°. The dropping funnel was replaced by a gas inlet tube of the sintered glass type and ethylene was passed into the rapidly stirred solution for three hours while the temperature was maintained between 40° and 45° by cooling in an ice bath at first and heating later. The reaction mixture was stirred slowly into a mixture of 500 ml. ethyl acetate, 2 kg. of ice and approximately 0.5 g. of hydroquinone.

The organic layer was separated and washed with water and with one liter of cold (N) sodium hydroxide. The solution was dried over magnesium sulfate, diluted with 500 ml. ethyl acetate and stirred at reflux two hours with two moles of sodium acetate. The solution was washed twice with water, dried over magnesium sulfate and the solvent distilled off. One-tenth grams of hydroquinone was added to the residue and it was purified by distillation under reduced pressure. The yield of ethyl $\Delta^{7,6}$-ketooctenoate, distilling 86° at .05 mm., was 135 g. (0.735 mole), 70.6%.

*Example 7*

In a liter three-neck flask equipped with stirrer, was placed 400 ml. of nitrobenzene. The flask was cooled in an ice bath while 266.7 g. (2.0 moles) of anhydrous granular aluminum chloride was stirred into the solvent. The flask was equipped with a dropping funnel and dry ice condenser and 193 g. (1 mole) of ethyl adipylchloride was added to the stirring solution over a period of five minutes. The dropping funnel was replaced by a gas inlet tube and isobutylene was passed into the rapidly stirred solution for one and one-half hours. The ice bath was then removed and the mixture warmed up to room temperature. Isobutylene was passed into the solution an additional half hour. At no time did isobutylene condense in the dry ice condenser; however, the volume of the reaction flask increased considerably indicating that the excess isobutylene was polymerized by the catalyst. The reaction mixture was stirred into a mixture of 500 ml. ethyl acetate and ice. The organic layer was separated, washed with dilute sodium hydroxide and dried over sodium sulfate. The organic solution was diluted with 500 ml. ethyl acetate and stirred at reflux temperature (92°) with 123 g. (1.5 moles) of powdered anhydrous sodium acetate. The mixture was cooled and the solid material filtered off. The filtrate was adjusted to pH 8 with 20% sodium hydroxide, washed twice with water and dried over sodium sulfate. The solvents were distilled off under reduced pressure and the product purified by distillation under reduced pressure. The fraction distilling 127°–140° at 2 mm. was collected as product. The yield of ethyl 8-methyl-$\Delta^{7,6}$-ketononenoate was 126 g. (0.594 mole), 59%. An aliquot was redistilled to obtain an analytical sample. The purified material had boiling point 120° at 1.2 mm. and $n_D^{21}$ 1.4610.

*Example 8*

In a 2-liter three-neck flask equipped with a fast and efficient stirrer, condenser, thermometer and dropping funnel were placed 572 g. (4.27 moles) of anhydrous granular aluminum chloride and 800 ml. of ethylene chloride. The reaction flask was cooled in an ice bath while 382 g. (2.14 moles) of methyl adipylchloride was added from the dropping funnel at such a rate that the temperature remained between 35°–40°. The dropping funnel was replaced by a gas inlet tube of the sintered glass type and ethylene was passed into the rapidly stirred solution. Absorption of the olefin was rapid. The temperature was maintained at 40°–50° by cooling with an ice bath. After one hour the absorption of ethylene was complete. The contents of the reaction flask were stirred into a mixture of a liter of ethyl acetate and ice to which approximately .5 g. of hydroquinone had been added as a stabilizer. The organic layer was separated and washed once with water and once with two liters of ice cold (N) sodium hydroxide. The organic solution was then dried over magnesium sulfate and then stirred at reflux temperature three hours with 352 g. (4.27 moles) of anhydrous sodium acetate. The reaction mixture was extracted twice with two liter volumes of ice water and dried over sodium sulfate. The solvent was distilled off under reduced pressure at the water pump and the product purified by distillation through a twenty-four inch electrically heated Vigreux column. The product, methyl- $\Delta^{7,6}$-ketooctenoate, distilled 97°–99° at 0.35 mm. and had $n_D^{20}$ 1.4519 and $d^{20}$ 1.016. The yield was 255.5 g. (1.5 moles), 70%.

I claim:
1. A compound having the formula

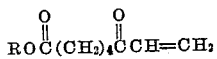
$$RO\overset{O}{\underset{\|}{C}}(CH_2)_4\overset{O}{\underset{\|}{C}}CH=CH_2$$

in which R is a lower alkyl radical.
2. Ethyl-$\Delta^{7,6}$-ketooctenoate.
3. Methyl-$\Delta^{7,6}$-ketooctenoate.
4. A method of preparing a lower alkyl ester of $\Delta^{7,6}$-ketooctenoic acid which comprises reacting a lower alkyl adipyl chloride with ethylene in the presence of at least two mols of aluminum chloride for each mol of acid halide and subsequently heating the reaction product until said compound is produced.

5. A method of preparing ethyl-$\Delta^{7,6}$-ketooctenoate which comprises reacting ethyl adipyl chloride with ethylene in the presence of at least two mols of aluminum chloride for each mol of acid halide, and subsequently heating the reaction product until said compound is produced.

References Cited in the file of this patent

Whitmore: Organic Chemistry, 1937, pages 86, 123, 349.

Thomas: Anhydrous Aluminum Chloride in Organic Chemistry, 1941, page 752.

Ralston: Fatty Acids and Their Derivative, 1948, page 454.

Bullock et al.: Journal of The American Chemical Society, vol. 74, 3455 (1952).